US011199417B2

(12) United States Patent
Swain et al.

(10) Patent No.: US 11,199,417 B2
(45) Date of Patent: Dec. 14, 2021

(54) DISTRIBUTED SYSTEM FOR DYNAMIC SENSOR-BASED TRIP ESTIMATION

(71) Applicant: Walmart Apollo, LLC, Bentonville, AR (US)

(72) Inventors: Jeeban Kumar Swain, Mangarajpur (IN); Shubham Sirothia, Bhopal (IN); Manish Kumar Barnwal, Burdwan (IN); Pralabh Kumar, New Delhi (IN)

(73) Assignee: Walmart Apollo, LLC, Bentonville, AR (US)

( * ) Notice: Subject to any disclaimer, the term of this patent is extended or adjusted under 35 U.S.C. 154(b) by 831 days.

(21) Appl. No.: 15/944,216

(22) Filed: Apr. 3, 2018

(65) Prior Publication Data

US 2018/0292218 A1    Oct. 11, 2018

Related U.S. Application Data

(60) Provisional application No. 62/481,933, filed on Apr. 5, 2017.

(51) Int. Cl.
*G01C 21/34* (2006.01)
*G01C 21/20* (2006.01)
*G06Q 30/06* (2012.01)
*G06Q 10/04* (2012.01)
(Continued)

(52) U.S. Cl.
CPC ......... *G01C 21/343* (2013.01); *G01C 21/206* (2013.01); *G06F 16/29* (2019.01);
(Continued)

(58) Field of Classification Search
CPC ............... G01C 21/343; G01C 21/206; G01C 21/3679; G01C 21/3476; G01C 21/3602;
(Continued)

(56) References Cited

U.S. PATENT DOCUMENTS 8,150,741 B2 * 4/2012 Figueroa ............... G06F 16/29
705/26.9
8,812,344 B1 * 8/2014 Saurabh ............ G06Q 30/0201
705/7.29
(Continued)

FOREIGN PATENT DOCUMENTS

CN      111563632 A  *  8/2020
WO    2015094262 A1      6/2015

*Primary Examiner* — Tuan C To
*Assistant Examiner* — Paul A Castro
(74) *Attorney, Agent, or Firm* — Fitch, Even, Tabin & Flannery LLP

(57) ABSTRACT

An example distributed system for trip estimation is described. The system includes a plurality of sensors disposed in a plurality of geographically distributed facilities. Each of the plurality of geographically distributed facilities includes departments including retrievable items, and each one of the plurality of geographically distributed facilities includes at least one of the plurality of sensors in each of the departments. The system includes a computing system in communication with the plurality of sensors and the one or more databases. The computing system can be configured to receive an item and a source geographic location from a user device, select a subset of the geographically distributed facilities, establish a contemporaneous density of people at a particular department corresponding to the item received from the user device, and output to a user interface on the user device an estimated first transit value based on the contemporaneous density.

19 Claims, 8 Drawing Sheets

(51) Int. Cl.
*G06F 16/29* (2019.01)
*G06F 16/9537* (2019.01)

(52) U.S. Cl.
CPC ......... *G06F 16/9537* (2019.01); *G06Q 10/04* (2013.01); *G06Q 30/0633* (2013.01); *G06Q 30/0641* (2013.01)

(58) Field of Classification Search
CPC .............. G01C 21/3611; G01C 21/362; G01C 21/3691; G01C 21/00; G01C 21/34; G01C 21/3453; G06F 16/9537; G06F 16/29; G06Q 10/04; G06Q 30/0633; G06Q 30/0641; G06Q 10/047; G06Q 10/025; G06Q 10/08
See application file for complete search history.

(56) References Cited

U.S. PATENT DOCUMENTS

| | | | |
|---|---|---|---|
| 9,113,309 B2 | 8/2015 | Uilecan et al. | |
| 9,354,065 B2 | 5/2016 | Ikavalko et al. | |
| 2002/0174021 A1* | 11/2002 | Chu | G06Q 30/0623 705/7.11 |
| 2010/0257195 A1* | 10/2010 | Inoue | G06F 16/951 707/769 |
| 2014/0180865 A1 | 6/2014 | Argue et al. | |
| 2014/0309923 A1* | 10/2014 | Ricci | G06F 16/25 701/400 |
| 2015/0012380 A1 | 1/2015 | Bank et al. | |
| 2015/0369611 A1 | 12/2015 | Ogishi | |
| 2016/0048905 A1 | 2/2016 | Yuan | |
| 2018/0136005 A1* | 5/2018 | Forutanpour | G01C 21/3602 |

\* cited by examiner

DISTRIBUTED SYSTEM FOR DYNAMIC SENSOR-BASED TRIP ESTIMATION

CROSS-REFERENCE TO RELATED APPLICATIONS

This application claims the benefit of, commonly assigned U.S. Provisional Patent Application No. 62/481,933, which was filed on Apr. 5, 2017. The entire content of the foregoing provisional patent application is incorporated herein by reference.

BACKGROUND

Real-time estimation of trips can be difficult due to various factors that can affect the trip.

SUMMARY

Exemplary embodiments of the present disclosure provide a distributed system for trip estimation that provides estimated transit values for visiting a facility based on the sensed density of people in specific departments within the facility and derived travel time. The distributed system includes a plurality of sensors in each facility and particularly within each department within the facility. Based on one or more desired items entered via a user device, the distributed system determines the closest facilities and the contemporaneous density of people within the departments corresponding to the entered items. The distributed system estimates transit values based on the detected density and travel to/from the facilities, and outputs an estimated total transit value to the user for the facility having the lowest combination of transit values. The user can decide whether to visit the facility based on the estimated trip time, and can choose to visit a facility with the shortest estimated trip time even if the total distance of the trip may not be the shortest, thereby improving the overall user experience.

In accordance with embodiments of the present disclosure, an exemplary distributed system for trip estimation is provided. The distributed system includes a plurality of sensors disposed in a plurality of geographically distributed facilities. Each of the plurality of geographically distributed facilities includes departments including retrievable items. Each one of the plurality of geographically distributed facilities includes at least one of the plurality of sensors in each of the departments. The distributed system includes one or more databases electronically storing data corresponding to availability of the retrievable items at each of the plurality of geographically distributed facilities. The distributed system includes a computing system in communication with the plurality of sensors and the one or more databases.

The computing system can be configured to receive an item and a source geographic location from a user device via a communication network. The computing system can be configured to select a subset of the geographically distributed facilities from the plurality of geographically distributed facilities based on a distance between the source geographic location and the plurality of geographically distributed facilities. The computing system can be configured to establish a contemporaneous density of people at a particular department corresponding to the item received from the user device at each of the subset of the geographically distributed facilities based on an output of the at least one of the plurality of sensors in each particular department at each one of the subset of the geographically distributed facilities.

The computing system can be configured to estimate a first transit value for each of the subset of the geographically distributed facilities based on the established contemporaneous density of people. The computing system can be configured to estimate a second transit value for travel from the source geographic location to each individual distributed facility of the subset of the geographically distributed facilities. The computing system can be configured to estimate a third transit value for travel from each individual distributed facility of the subset of the geographically distributed facilities to the source geographic location. The computing system can be configured to output to a user interface on the user device via the communication network an estimated total transit value for the geographically distributed facility having a lowest combination of the first, second, and third transit values.

In one embodiment, the contemporaneous density of people can be established substantially in real-time. The computing system can be configured to electronically transmit data corresponding to the established contemporaneous density of people to the one or more databases. The computing system can be configured to output to the user interface on the user device via the communication network a ranked list of the subset of the geographically distributed facilities based on the estimated total transit values for each of the geographically distributed facilities of the subset of the geographically distributed facilities (e.g., from shortest transit value to highest transit value). In exemplary embodiments, the system can recommend one or more facilities based on the total transit values.

In one embodiment, the computing system can be configured to receive a time or time range for traveling to one of the plurality of geographically distributed facilities from the user interface of the user device via the communication network. The computing system can be configured to estimate an optimal estimated total transit value within the time range. The estimated first transit value can be a time period for locating the item and procuring the item at each of the subset of the geographically distributed facilities based on the established contemporaneous density of people. The estimated second transit value and the estimated third transit values can be determined based on a global positioning system in communication with the computing system via the communication network.

In one embodiment, the one or more database can electronically store data corresponding to historical first transit values associated with the retrievable items at each of the plurality of geographically distributed facilities. The computing system can be configured to estimate the first transit value for each of the subset of the geographically distributed facilities based on the established contemporaneous density of people and the historical first transit values.

In one embodiment, each of the plurality of geographically distributed facilities can include at least one of the plurality of sensors in a procurement area. The computing system can be configured to establish a contemporaneous density of people at the procurement area at each of the subset of the geographically distributed facilities based on an output of the at least one of the plurality of sensors at each one of the plurality of geographically distributed facilities. The computing system can be configured to estimate the first transit value for each of the subset of the geographically distributed facilities based on the established contemporaneous density of people at the department corresponding to the item received from the user interface and the established contemporaneous density of people at the procurement area.

In one embodiment, the computing system can be configured to output to the user interface on the user device via the communication network an unavailability of the item at the subset of the geographically distributed facilities.

In accordance with embodiments of the present disclosure, an exemplary non-transitory computer-readable medium storing instructions for estimating a total transit value is provided. The instructions can be executable by a processing device of a computing system. Execution of the instructions by the processing device can cause the processing device to electronically store, in one or more databases, data corresponding to availability of retrievable items at each of a plurality of geographically distributed facilities. Each of the plurality of geographically distributed facilities includes departments including the retrievable items and at least one of a plurality of sensors disposed in each of the departments. Execution of the instructions by the processing device can cause the processing device to receive an item and a source geographic location from a user device via a communication network at the computing system. The computing system can be in communication with the plurality of sensors and the one or more databases.

Execution of the instructions by the processing device can cause the processing device to select a subset of the geographically distributed facilities from the plurality of geographically distributed facilities based on a distance between the source geographic location and the plurality of geographically distributed facilities. Execution of the instructions by the processing device can cause the processing device to establish a contemporaneous density of people at a particular department corresponding to the item received from the user device at each of the subset of the geographically distributed facilities based on an output of the at least one of the plurality of sensors in each particular department of each one of the subset of the geographically distributed facilities.

Execution of the instructions by the processing device can cause the processing device to estimate a first transit value for each of the subset of the geographically distributed facilities based on the established contemporaneous density of people. Execution of the instructions by the processing device can cause the processing device to estimate a second transit value for travel from the source geographic location to each individual distributed facility of the subset of the geographically distributed facilities. Execution of the instructions by the processing device can cause the processing device to estimate a third transit value for travel from each individual distributed facility of the subset of the geographically distributed facilities to the source geographic location. Execution of the instructions by the processing device can cause the processing device to output to the user interface on the user device via the communication network an estimated total transit value for the geographically distributed facility having a lowest combination of the first, second, and third transit values.

In one embodiment, execution of the instructions by the processing device can cause the processing device to output to the user interface on the user device via the communication network a ranked list of the subset of the geographically distributed facilities based on the estimated total transit values for each of the geographically distributed facilities of the subset of the geographically distributed facilities. In one embodiment, execution of the instructions by the processing device can cause the processing device to receive a time or time range for traveling to one of the plurality of geographically distributed facilities from the user interface of the user device via the communication network. Execution of the instructions by the processing device can cause the processing device to estimate an optimal estimated total transit value within the time range.

In one embodiment, execution of the instructions by the processing device can cause the processing device to electronically store data corresponding to historical first transit values associated with the retrievable items at each of the plurality of geographically distributed facilities in the one or more databases. Execution of the instructions by the processing device can cause the processing device to estimate the first transit value for each of the subset of the geographically distributed facilities based on the established contemporaneous density of people and the historical first transit values.

In one embodiment, each of the plurality of geographically distributed facilities can include at least one of the plurality of sensors in a procurement area. Execution of the instructions by the processing device can cause the processing device to establish a contemporaneous density of people at the procurement area at each of the subset of the geographically distributed facilities based on an output of the at least one of the plurality of sensors at each one of the plurality of geographically distributed facilities. Execution of the instructions by the processing device can cause the processing device to estimate the first transit value for each of the subset of the geographically distributed facilities based on the established contemporaneous density of people at the department corresponding to the item received from the user interface and the established contemporaneous density of people at the procurement area. In one embodiment, execution of the instructions by the processing device can cause the processing device to output to the user interface on the user device via the communication network an unavailability of the item at the subset of the geographically distributed facilities.

In accordance with embodiments of the present disclosure, an exemplary method of estimating a total transit value is provided. The method includes electronically storing in one or more databases data corresponding to availability of retrievable items at each of a plurality of geographically distributed facilities. Each of the plurality of geographically distributed facilities can include departments including the retrievable items and at least one of a plurality of sensors disposed in each of the departments. The method includes receiving an item and a source geographic location from a user device via a communication network at the computing system. The computing system can be in communication with the plurality of sensors and the one or more databases. The method includes selecting a subset of the geographically distributed facilities from the plurality of geographically distributed facilities based on a distance between the source geographic location and the plurality of geographically distributed facilities.

The method includes establishing a contemporaneous density of people at a particular department corresponding to the item received from the user interface at each of the subset of the geographically distributed facilities based on an output of the at least one of the plurality of sensors in each particular department at each one of the subset of the geographically distributed facilities. The method includes estimating a first transit value for each of the subset of the geographically distributed facilities based on the established contemporaneous density of people. The method includes estimating a second transit value for travel from the source geographic location to each individual distributed facility of the subset of the geographically distributed facilities. The method includes estimating a third transit value for travel from each individual distributed facility of the subset of the geographically distributed facilities to the source geographic location. The method includes outputting to a user interface on the user device via the communication network an estimated total transit value for the geographically distributed facility having a lowest combination of the first, second, and third transit values.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the distributed systems for trip estimation, reference is made to the accompanying figures, wherein.

DETAILED DESCRIPTION

Exemplary embodiments of the present disclosure provide a distributed system for dynamic sensor-based trip estimation that provides estimated total transit values for visiting geographically distributed facilities based on the density of people in specific departments within the facility and travel time. The distributed system includes sensors in each facility and particularly within each department within the facility. Based on one or more desired items entered via a user device, the system determines the contemporaneous density of people within the departments corresponding to the entered items via the sensors. The distributed system estimates transit values based on the detected density and travel to/from the facilities, and outputs an estimated total transit value for the facility having the lowest combination of transit values. The user can decide whether to visit the facility based on the estimated trip time, and can choose to visit a facility with the shortest estimated trip time even if the total distance of the trip may not be the shortest, thereby improving the overall user experience.

Figure 1:
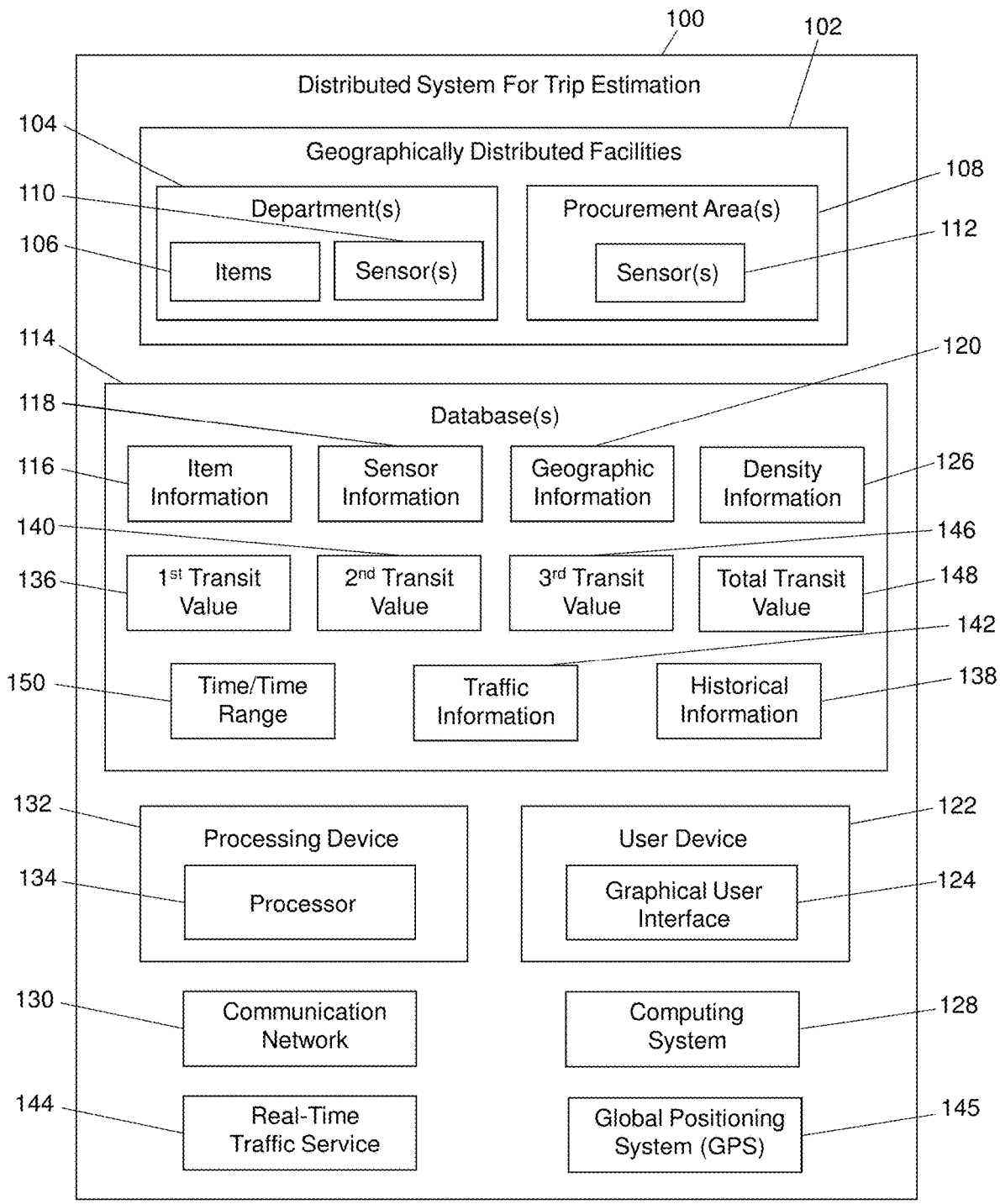
FIG. 1 is a block diagram of an exemplary distributed system for dynamic sensor-based trip estimation of the present disclosure.

FIG. 1 is a block diagram of an exemplary distributed system for dynamic sensor-based trip estimation 100 (hereinafter "system 100") of the present disclosure. The system 100 includes a plurality of geographically distributed facilities 102. Each facility 102 includes one or more departments 104 with different retrievable items 106. For example, the facility 102 can include departments 104 such as sports, men's clothing, women's clothing, grocery, dairy, electronics, automotive, toys, or the like, with each department 104 having multiple items 106 available to a user. Each facility 102 generally includes one or more procurement areas 108 at which the retrievable items 106 can be attained.

Each facility 102 includes sensors 110, with at least one sensor 110 positioned in each department 104. In one embodiment, the sensors 110 can be in the form of a camera (e.g., still image camera, video camera, combinations thereof, or the like). Images or video captured by the sensors 110 can be analyzed via, e.g., image or video analytics, to determine a density of people within the respective departments 104. In particular, the density corresponds to the count of number of people within the respective departments 104 at a given time. In some embodiments, face detection classifiers can be used as a neural-based algorithm that classifies whether the detected object is the face of a person or not. The density count is refreshed at every fixed interval of time (e.g., every 30 seconds, every minute, every five minutes, or the like) to represent the density of people within the respective departments 104. In one embodiment, the sensors 110 can be configured to detect the density of people within the departments 104 substantially in real-time. In one embodiment, the facility 102 can also include one or more sensors 112 positioned at each procurement area 108. The sensors 112 can be substantially similar to the sensors 110, and can be configured to detect the density of people at the procurement area 108 substantially in real-time. In one embodiment, the facility 102 can include one or more sensors similar to sensors 110, 112 positioned within a parking area associated with the facility 102, the sensors being configured to detect the density of vehicles in the parking area.

The system 100 includes one or more databases 114 configured to electronically store data corresponding to information gathered, analyzed and output by the system 100. The database 114 includes item information 116 corresponding to the retrievable items 106 at the facilities 102. The item information 116 can include item names, item prices, item location (e.g., at a specific department 104), item weight, item availability (e.g., inventory), similar items (e.g., if a desired item is not available, which items could be offered as a replacement), combinations thereof, or the like. The item information 116 can be separated into data corresponding to each of the facilities 102 to determine whether all of the items desired by a user are available for purchase at a single facility 102.

The database 114 includes sensor information 118 with data regarding the sensors 110, 112. For example, the sensor information 118 can include the sensor specifications, sensor locations (e.g., based on department 104), sensor names, other sensors located in the same department 104), combinations thereof, or the like. The database 114 includes geographic information 120 with data corresponding to the geographic location of the user (as received from a user device 122 having a graphical user interface (GUI) 124), the geographic location of each of the facilities 102, combinations thereof, or the like.

The database 114 includes contemporaneously sensed density information 126 corresponding to data captured by the sensors 110, 112. For example, the density information 126 can include data corresponding to the density (e.g., density trend) detected by the sensors 110 at one or more of the departments 104. The density information 126 can also include data corresponding to the density (e.g., density trend) detected by the sensors 112 at one or more of the procurement areas 108. In one embodiment, the density information 126 can include data corresponding to the density (e.g., density trend) detected by sensors at one or more parking areas associated with the facility 102.

The system 100 includes one or more computing systems 128 in wired and/or wireless communication with the sensors 110, 112 and the database 114 via a communication network 130. The computing system 128 can therefore electronically receive/transmit data from/to the sensors 110, 112 and the database 114. In some embodiments, the system 100 can include a processing device 132 including a processor 134 for executing instructions related to operation of one or more components of the system 100. In one embodiment, the processing device 132 and processor 134 can be incorporated into the computing system 128.

A user interested in procuring one or more items can input the one or more desired items via the GUI 124 of the user device 122 (e.g., a portable electronic device, a personal computer, or the like). The user can also input the source geographic location of the user via the GUI 124 and/or the source geographic location can be ascertained via a global positioning system (GPS) function of the user device 122. The input data can be electronically transmitted to the computing system 128 via the communication network 130. Based on a distance between the source geographic location of the user and the geographic information 120 of the facilities 102, the computing system 128 can select a subset of the facilities 102 to consider as potential options for the user. For example, the computing system 128 can select the subset of the facilities 102 based on a geographic distance between the user and the facilities 102 (e.g., a radius of 30 miles, a radius of 20 miles, a radius of 10 miles, or the like). The most geographically convenient facilities 102 can thereby be considered by the system 100.

Based on the items input by the user, the subset of the facilities 102, and the item information 116, the computing system 128 can determine whether the each facility 102 of the subset of the facilities 102 has each of the items available for procurement. In one embodiment, if none of the facilities 102 have each of the items available for procurement, the computing system 128 can generate a transmission to the GUI 124 via the communication network 130 indicating to the user the unavailability of the desired items. In one embodiment, if none of the facilities 102 have each of the items available for procurement, the computing system 128 can generate a transmission to the GUI 124 via the communication network 130 indicating to the user the unavailability of the desired items and further indicating the ability of potential substitutes for the desired item (e.g., different brands).

If the items input by the user (and/or substitute items) are available at one or more of the facilities 102, the system 100 can progress to the step of determining the contemporaneous sensed density at the specific departments 104 of the facilities 102. In particular, based on the specific items input by the user, the computing system 128 can establish the contemporaneous sensed density of people at the particular departments 104 corresponding to the received items from an output of the sensors 110 at the subset of facilities 102. For example, if the user input milk, apples, and tennis balls as the items of interest, the computing system 128 can determine the substantially real-time density of people at the dairy department, grocery department, and sports department based on the output of sensor(s) in each of these departments.

In one embodiment, the computing system 128 can process the contemporaneous output of each of the respective sensors 110 to determine the density. In one embodiment, the sensors 110 can transmit the substantially real-time detected information to the density information 126, and the computing system 128 can query the density information 126 based on the input items. Thus, rather than determining the density for the entire facility 102, the system 100 determines the density for each of the individual departments 104 based on the particular items desired for procurement by the user. The computing system 128 can also determine the contemporaneous density of people at the procurement area 108 based on the signals received from the sensors 112. In one embodiment, the computing system 128 can determine the contemporaneous density of people and/or cars at the parking area associated with the facilities 102.

Based on the established contemporaneous sensed density of people at the departments 104 specific to the items input by the user, the computing system 128 can estimate a first transit value 136 for each of the subset of facilities 102. The first transit value 136 can include the time period for locating each of the input items at the respective departments 104 at each facility of the subset of facilities 102 based on the density information 126. The first transit value 136 can also include the time period for procuring the items at each facility of the subset of facilities 102 based on the density information 126. The first transit value 136 therefore reflects an estimated time period for locating and gathering the desired items, and procuring the items (e.g., the time period to be spent within the facility). For example, if the density within one or more of the departments 104 is high, the first transit value 136 would be high. If the density within the departments 104 is low, the first transit value 136 would be low. In some embodiments, the first transit value 136 can also incorporate the time period for parking in a parking area and exiting the parking area based on the density information 126 associated with the parking area. The first transit value 136 can be electronically stored in the database 114.

In one embodiment, the database 114 can electronically store historical information 138 corresponding to historical first transit values 136 associated with the retrievable items 106 at the facilities 102. For example, the historical information 138 can include the correlations between detected density information 126, the estimated first transit value 136, and the actual time period taken by the user at the facility 102. In one embodiment, after using the system 100, the user can provide feedback to the system 100 via the GUI 124 regarding the accuracy of the estimated first transit value 136. The historical information 138 can adjust the correlation between the density information 126 and the estimated first transit value 136 for each department 104 based on the feedback received from the user. In one embodiment, the computing system 128 can estimate the first transit value 136 based on the established contemporaneously sensed density information 126 and the historical information 138. In particular, the system 100 can utilize a machine learning model that is trained by the historical information 138 such that adjustments of the estimated first transit value 136 can be made based on previous estimations of the detected density and the actual time period spent by a user at the facility 102 (or the individual departments 104).

The computing system 128 determines a second transit value 140 corresponding to the travel time from the source geographic location (e.g., a starting address) of the user to each individual facility 102 of the subset of facilities 102. The computing system 128 can receive geographic information 120 from the database 114 with the physical location of the facilities 102, and further receives traffic information 142 via the communication network 130 from a real-time traffic service 144. The real-time traffic service 144 can transmit the traffic information 142 to the database 114, and the traffic information 142 can be transmitted to the computing system 128. Based on the traffic information 142, the computing system 128 can estimate the total travel time from the source geographic location to the location of the individual facilities 102 while taking into account traffic patterns and considering one or more routes. In one embodiment, the system 100 can include a global positioning system (GPS) 145 configured to generate different routes from the source geographic location to the location of the individual facilities 102. In such embodiments, the GPS 145 can determine the routes and the real-time traffic service 144 can determine the time of travel for each route.

The computing system 128 determines a third transit value 146 corresponding to the travel time from each individual facility 102 of the subset of facilities 102 to the source geographic location of the user (or another location input by the user as the return address). The computing system 128 can electronically receive the traffic information 142 from the database 114, and estimates the total travel time from the location of the individual facilities 102 to the user location while taking into account traffic patterns.

The computing system 128 can combine the first, second and third transit values 136, 140, 146 for each of the facilities 102 of the subset of facilities 102 to determine an estimated total transit value 148. The total transit value 148 corresponds to the estimated travel time to and from the facilities 102, and the estimated time spent at the facility 102 retrieving and procuring the input items. In one embodiment, the computing system 128 can output to the GUI 124 on the user device 122 the estimated total transit value 148 for the facility 102 of the subset of facilities 102 having the lowest or shortest total transit value 148. If any of the input items are unavailable at the facility 102, the output data can also include the unavailability information corresponding to specific items.

In one embodiment, the computing system 128 can output to the GUI 124 on the user device 122 a ranked and/or recommended list of the subset of facilities 102 (e.g., two or more facilities 102) based on the estimated total transit values 148 for the facilities 102. For example, the user can receive a ranked and/or recommended list showing a first facility 102 having the lowest or shortest total transit value 148, a second facility 102 having the second lowest or shortest total transit value 148, a third facility 102 having the third lowest or shortest total transit value 148, and so on.

In one embodiment, the user can input via the GUI 124 a time or time range 150 for traveling to one of the facilities 102. The time or time range 150 can correspond to the desired time period (and/or day) during which the user wishes to travel to the facility 102 and/or the amount of time the user has available to travel to/from the facility 102 to procure the items. The computing system 128 can estimate the total transit value 148 within the time range 150, and outputs to the user an optimal estimated total transit value 148 for the time range 150.

For example, if the user inputs their availability from 1:00 pm to 5:00 pm, the computing system 128 can output the shortest total transit value 148 (or a ranked list of transit values 148) during the input time range (e.g., the shortest total transit value would be 3:30 pm). The user can therefore choose to visit the facility at the shortest estimated optimal time. As a further example, if the user inputs their availability for only one hour, the computing system 128 can output the estimated total transit value 148 for a facility 102 that would allow the user to travel to/from the facility 102 and procure the desired items within the one hour limit. The system 100 therefore allows the user to select an optimal travel time window based on the total transit value 148.

Equation 1 below shows the method of calculating the total transit value 148, where $TT_{H-S}$ is the estimated travel time from the user's location to the facility 102 (e.g., the second transit value 140), E (store time) is the estimated time the user spends in the facility for locating and procuring the items (e.g., the first transit value 136), and $TT_{S-H}$ is the estimated time from the facility 102 to the user's location (e.g., the third transit value 146). Both $TT_{H-S}$ and $TT_{S-H}$ can be taken from real-time traffic service 144 and/or the GPS 145. The user can enter the starting or user location via the GUI 124, such as the user's home, office, or any other starting location.

$$\text{Total shopping time} = TT_{H-S} + E(\text{store time}) + TT_{S-H} \quad (1)$$

After the user inputs a starting location and/or the starting locations ascertained via GPS, a geo-coder of the system 100 can extract latitude and longitude coordinates of the user's current location and determines the surrounding facilities 102 from the geographic information 120. Using the geographic coordinates of the source location and the nearby stores (and the traffic information 142), the first and second transit values 140, 146 can be estimated.

In one embodiment, the system 100 can collect and store the data corresponding to the estimated density information 126, first transit value 136, second transit value 140, third transit value 146, and total transit value 148, as historical information 138. The system 100 can also collect and store feedback data via the GUI 124 to determine the accuracy of the estimated values of the system 100. For example, if the system 100 estimates a total transit value 148 of one hour for a user and the actual transit value is two hours, the user can provide the appropriate feedback to the system 100 via the GUI 124. Based on the feedback, the system 100 can incorporate the historical information 138 into the determination of the total transit value 148. In one embodiment, the data can be collected and analyzed for only some of the facilities 102 and for a short period of time (e.g., one month), and the data can be further extrapolated to the other facilities 102 and for a complete yearly period. The system 100 can adjust the determination of the total transit value 148 based on continued feedback received from users.

In one embodiment, the sensors 110, 112 can include a proximity sensor functionality. In such embodiments, when a user enters a facility 102, the user device 122 can be automatically communicatively connected to the sensors 110, 112. Based on the signal strength, the system 100 can determine the time stamp of the user's entry into the facility 102 (e.g., $t_1$) to capture the starting time for locating and procuring items. After visiting the specific departments 104 and procuring the items at the procurement area 108, the user leaves the facility 102. Upon disconnection from the sensors 110, 112, the system 100 captures the time stamp for the end of the location and procurement period (e.g., $t_2$). The first transit value 136 (e.g., the total time spent at the facility 102) can be determines by the difference between $t_2$ and $t_1$.

The system 100 determines the total transit value 148 based on several variables. One variable includes the input item count and the departments 104 associated with the items. Generally, users with a greater number of desired items will take more time compared to a user with a lesser number of desired items. In such cases, the type of department 104 can play a role in estimating the shopping time as item-picking-time can vary from department 104 to department 104. For example, picking an item from the pharmacy or automobile department can take more time as compared to picking an item from the grocery or frozen food department. Department density (e.g., the density information 126) is also one of the major deciding variables for the system 100. For example, if a user is procuring an item from a heavily crowded department 104, it will take more time to procure the item as compared to a less crowded department 104.

The system 100 can also consider additional variables to reduce the overall noise associated in estimating the total transit value 148, thereby improving operation of the system 100. One variable the system considers is the time of visit. For example, a user visiting the facility 102 during peak time (e.g., the evening hours) may take more time as compared to a user visiting the store during non-peak times (e.g., afternoon hours). The system 100 can capture data based on twenty-four one-hour windows to cover the entire day (e.g., 10:00 AM-11:00 AM, 11:00 AM-12:00 PM and so on).

Another variable considered by the system 100 is whether the visit is occurring on a weekday or weekend. In general, on weekdays it can take less time for locating and procuring the same set of items as compared to on the weekend (e.g., a longer first transit value 136). Another variable considered by the system 100 is whether the day of the visit is occurring on a holiday. In general, visiting the facility 102 during a holiday generally results in a longer first transit value 136. Another variable considered by the system 100 is the density of people at the procurement area 108, since this density includes people from all of the departments 104.

Another variable considered by the system 100 is the month of the year in which the visit is occurring. For example, more users visit facilities 102 during December and January due to holidays as compared to other months. The historical information 138 can therefore include the variability in user visits during specific months. Another variable considered by the system 100 is seasonal days. There can be certain seasonal days where footfall is higher as compared to other days. For example, facilities 102 can be crowded during Christmas and Thanksgiving days as compared to other days. The historical information 138 therefore considers the difference in density information 126 during seasonal days as compared to other days.

As the system 100 collects and analyzes the data, the system 100 can be trained via a regression model to improve the accuracy of determining the total transit value 148. The regression model can provide the beta coefficients for all of the attributes that impact the total time spent by a user at the facility 102 that can be used to estimate the first transit value 136. The beta value can be a measure of how strongly each predictor variable influences the dependent variable. For example, a beta value of 2.5 for user density indicates that a change of one unit in the user density will result in a change of 2.5 units in the first transit value 136, considering other factors are constant. Thus, the higher the beta value the greater the impact of the predictor variable on the criterion variable.

In the regression model, to interpret the direction of the relationship between variables, the signs (e.g., plus or minus) of the beta coefficients can be reviewed. If a beta coefficient is positive, relationship of this variable with the dependent variable is positive (e.g., the greater the number of items procured, the greater the first transit value 136 will be). If the beta coefficient is negative, the relationship is negative (e.g., the larger number of procurement lanes will result in a lesser checkout time). The intercept of the regression model can take into consideration the effect of variables like procurement time, user arbitrary travel time from one department 104 to another department 104, and the effect of some other factors that may not be captured by the explanatory variables.

Tables 1 and 2 show examples of data that can be captured and analyzed by the system 100. The time spent in locating and procuring the item can be the dependent variable while the rest of the attributes can be used to explain the first transit value 136 in a multivariate manner.

TABLE 1

Items In Each Department

| User ID | Time In Facility (in mm) | Visit Time | Total Items | Items in Dept. 1 | Items in Dept. 2 | Items in Dept. n |
|---|---|---|---|---|---|---|
| 1 | 40 | 10-11 AM | 43 | 17 | 12 | 14 |
| 2 | 30 | 2-3 PM | 46 | 20 | 10 | 16 |
| 3 | 120 | 6-7 PM | 47 | 17 | 15 | 15 |

TABLE 2

User Density In Each Department

| User ID | Weekday/ Weekend | Is Holiday | Month | Density In Dept. 1 | Density In Dept. n | Facility Type |
|---|---|---|---|---|---|---|
| 1 | 1 | 1 | January | 193 | 121 | Supercenter |
| 2 | 0 | 1 | March | 128 | 100 | Neighborhood Market |
| 3 | 1 | 0 | June | 262 | 224 | Express |

The regression equation can be represented by Equation 2, below. Intercept can represent the expected value of the dependent variable when all of the independent variables are zero (e.g., the expected value of time taken when all of the factors are zero, as calculated by a trained model). TotalItems represents the total number of items procured by a user, DayOfWeek represents the day of the week of the visit to the facility 102, Items in Dept1 represents the number of items obtained from the first department 104, Items in Dept2 represents the number of items obtained from the second department 104, IsHoliday represents whether the day of the visit falls on a holiday, Demographics represents the demographics of the facility 102, and UserDensity represents the density information 126.

$$1^{st} \text{ Transit Value} = \text{Intercept} + B1*\text{TotalItems} + B2*\text{DayOfWeek} + B3*\text{\#Items in Dept1} + B4*\text{\#Items in Dept2} + B5*\text{IsHoliday} + B6*\text{Demographics} + B7*\text{UserDensity} \quad (2)$$

As an example, a user may wish to visit a facility to procure ten items from the grocery department and four items from the dairy department. The total number items procured by user would be 10+4=14. It can take the user about ten minutes to reach the facility 102 from the user's home which is estimated using the real-time traffic service 144 and/or the GPS 145. Therefore, the total time spent by the user in the facility 102 can be calculated Equations 3-5, with Equation 3 showing intercept and beta-coefficients that were obtained from a machine learning model using training data.

$$\text{In Facility Time} = 15 + 1*14 + 2*10 + 1.5*0 + 3*4 = 60 \text{ min} \quad (3)$$

$$\begin{aligned}\text{Total Transit Value} &= \text{Travel Time From Home to} \\ &\text{Facility} + \text{In Facility Time} + \text{Travel Time From} \\ &\text{Facility to Home}\end{aligned} \quad (4)$$

$$\text{Total Transit Value} = 10 + 60 + 10 = 80 \text{ min} \quad (5)$$

As shown in Equation 4, the total transit value 148 can be determined based on the travel time from the user's home to the facility 102, the time spent in the facility 102, and the travel time from the facility 102 to the user's home. If the second transit value 140 is ten minutes, the third transit value 146 is ten minutes, and the first transit value is sixty minutes, the total transit value can be estimated as approximately eighty minutes. The user would therefore be notified of the estimated eighty minutes it would take to procure the desired items prior to leaving for the facility 102. The user can therefore make a decision whether to travel to the facility 102 or to wait until the density in the departments 104 is lower.

As noted above, the system 100 can continuously function as a learning self-improving model The predictive framework of the system 100 can be adaptive in nature. In particular, the system 100 can determine the estimation accuracy for each trip provided to the user. The feedback received by the system 100 regarding the estimation accuracy can be analyzed by the computing system 128 to improve future estimations of the total transit value 148. For example, the system 100 can recommended forty minutes as the total transit value 148 for a user while the actual time taken was fifty minutes (e.g., an error of ten minutes for that user as per the recommendation). Due to the error in prediction, the model can penalize the regression results by adjusting the beta coefficients to minimize the error in predicting the total transit value 148 at a future time.

The user density information can be estimated based on the images captured by the sensors 110, 112. For example, CCTV video footage can be analyzed with a statistical tool executed by the computing system 128 to determine the headcount within each department 104. In one embodiment, the estimation of user density can be performed continuously in batches. For example, the system 100 can start calculating a user density at 11:00 AM and complete calculating the density by 11:30 AM. The system 100 could implement real-time density information 126 or density information 126 associated with the last determination of the density by the system 100. Thus, a user implementing the system 100 at 11:45 AM could be provided with the density at 11:45 AM or the last determined density (e.g., 11:30 AM).

If the user enters the time/time range 150 for a future day or time, the system 100 can estimate the user density based on historical information 138. For example, the system 100 can average the past user density at the specific time and/or day. To determine the average procurement time, a statistical algorithm in addition to data from the sensors 112 can be used in a neural network for the head count. The neural network can be a classification architecture that can be used to predict whether a human face is captured in the image or video of the sensors 110, 112. The human face data can be extracted from the data associated with the sensors 110, 112 to determine the density at the procurement area 108. As an example, in the neural network if a human face is detected, the system 100 can mark the value as 1, and otherwise mark the value as 0. The estimated total number of users can thereby be determined via image or video analytics.

Figure 2:
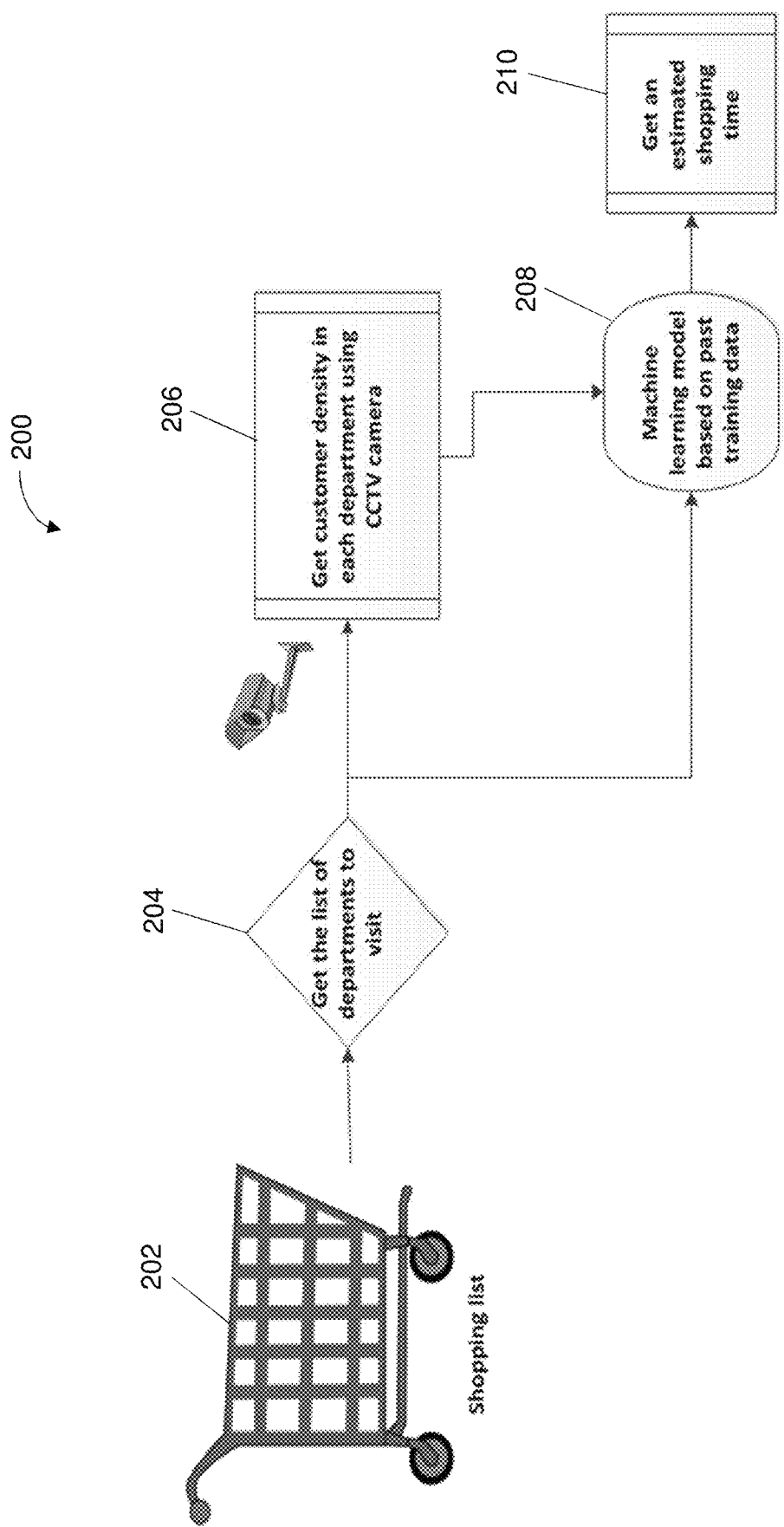
FIG. 2 is a flowchart illustrating a process implemented by an exemplary distributed system for dynamic sensor-based trip estimation of the present disclosure.

FIG. 2 is a flowchart illustrating an example process 200 implemented by the system 100. At step 202, the user inputs the desired items to be procured via the GUI 124. At step 204, the system 100 can determine the specific departments 104 corresponding to the input items. At step 206, the system 100 can determine the density of people at each of the specific departments 104 (e.g., only the departments 104 in which the input items are located) from sensors 110. At step 208, the system 100 can use historical information 138 to adjust the density information 126 prior to estimating the total transit value 148. For example, the system 100 can include a machine learning model based on the historical information 138 that adjusts the time period based on previous estimations of the detected density and the actual time period spent by a user at the facility 102 (or the individual departments 104). At step 210, the system 100 can output to the GUI 124 the estimated total transit value 148.

Figure 3:
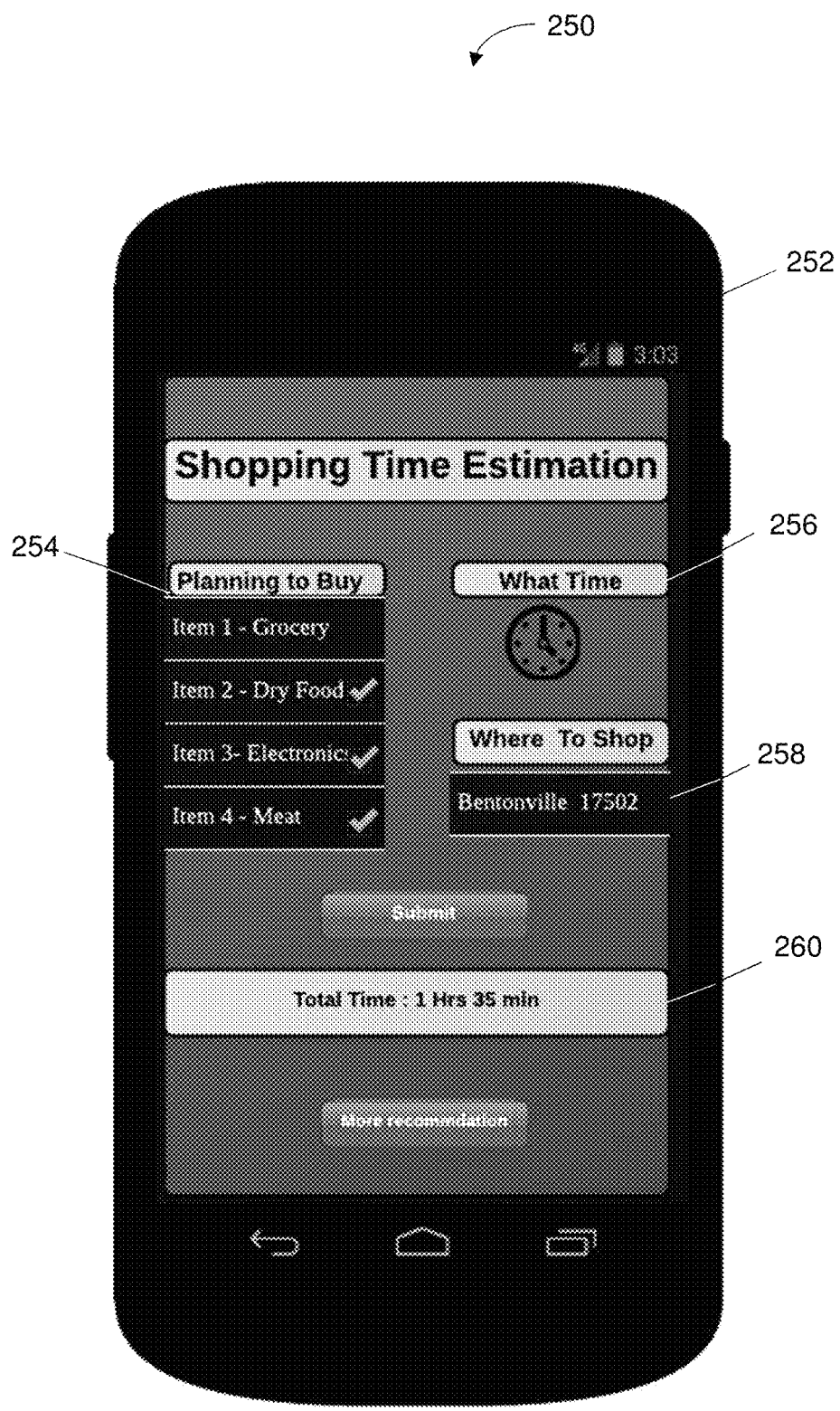
FIG. 3 is a diagrammatic view of an exemplary user interface of a distributed system for dynamic sensor-based trip estimation of the present disclosure, including an interface for input of item and time information.
Figure 4:
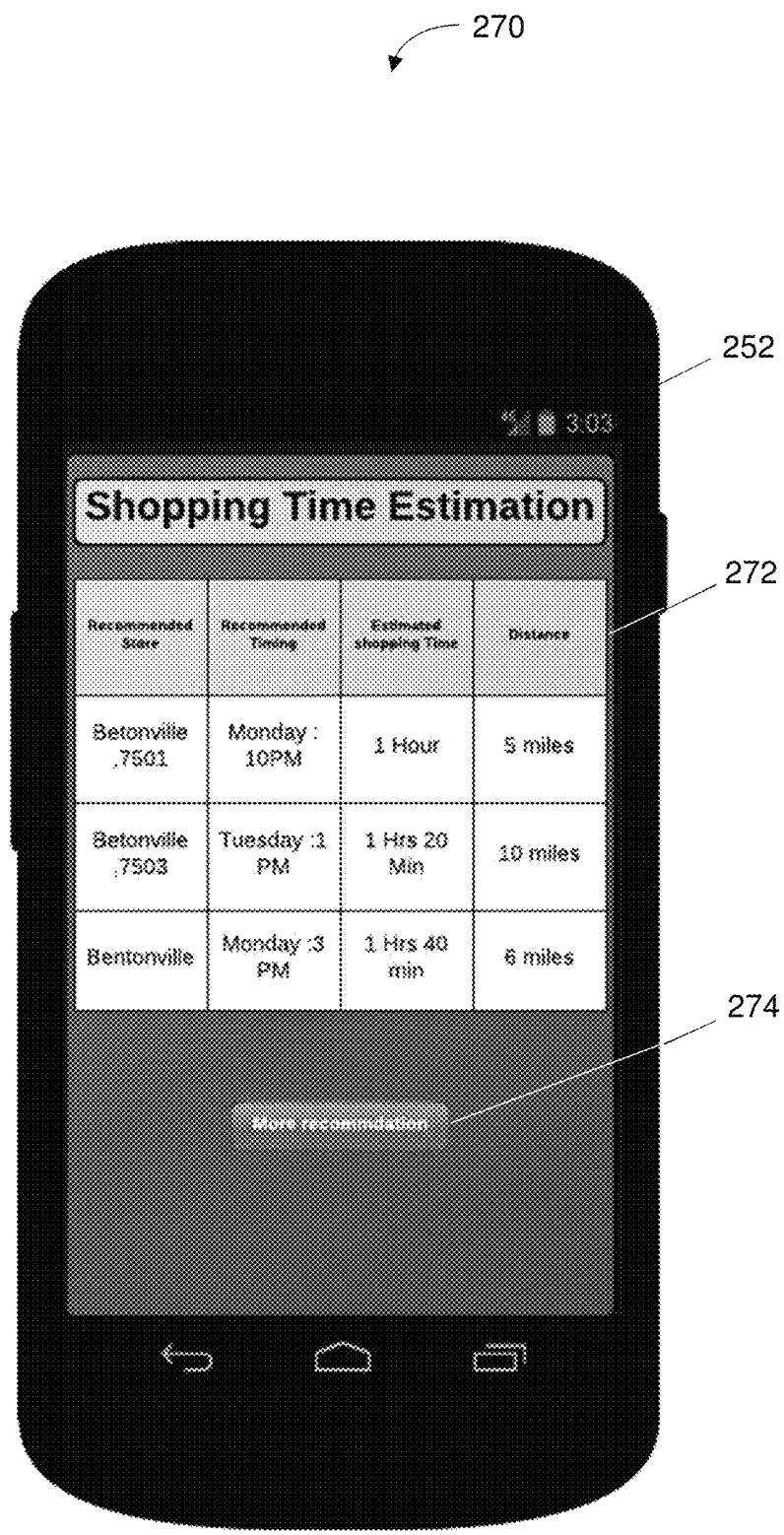
FIG. 4 is a diagrammatic view of an exemplary user interface of a distributed system for dynamic sensor-based trip estimation of the present disclosure, including an interface for output of estimated total transit values to a user.

FIGS. 3 and 4 show diagrammatic views of exemplary user interfaces 250, 270 of the system 100. In particular, FIG. 3 shows the user interface 250 for input of data into the system 100, and FIG. 4 shows the user interface 270 outputting the total transit values 148. The user interface 250 is provided on the user device 252. The user interface 250 can include an item input section 254 in which the user can input one or more items to be procured. The item input section 254 can include a query section for searching for the desired item, and can further include information regarding the department in which the item is located.

The user interface 250 can include a time input section 256 in which the user can input the desired time for the visit to the facility 102. In one embodiment, the time input section 256 can receive a time range during which the user is available to visit the facility 102. The user interface 250 includes a geographic location input section 258 in which the user can input geographic location regarding the user's location. The geographic location input by the user can be used to determine the travel times to/from facilities 102 and the nearest facilities 102 to the user. The user interface 250 can include a total time input section 260 in which the user can input the total time the user is available to visit the facility 102.

As shown in FIG. 4, upon entry of the items of interest and the geographic location of the user, the user interface 270 can display a table 272 with a ranked list of facilities 102. For example, for the first facility, the recommended timing for the visit is Monday at 10:00 PM, the estimated first transit value 136 is one hour, and the distance to the facility is five miles. As a further example, for the second facility, the recommended timing for the visit is Tuesday at 1:00 PM, the estimated first transit value 136 is one hour and twenty minutes, and the distance to the facility is ten miles. As a further example, for the third facility, the recommended timing for the visit is Monday at 3:00 PM, the estimated first transit value 136 is one hour and forty minutes, and the distance to the facility is six miles. If addition recommendations are desired, the user can actuate a button 274 and the ranked list can be populated with the next facilities 102 in line based on rank.

Figure 5:
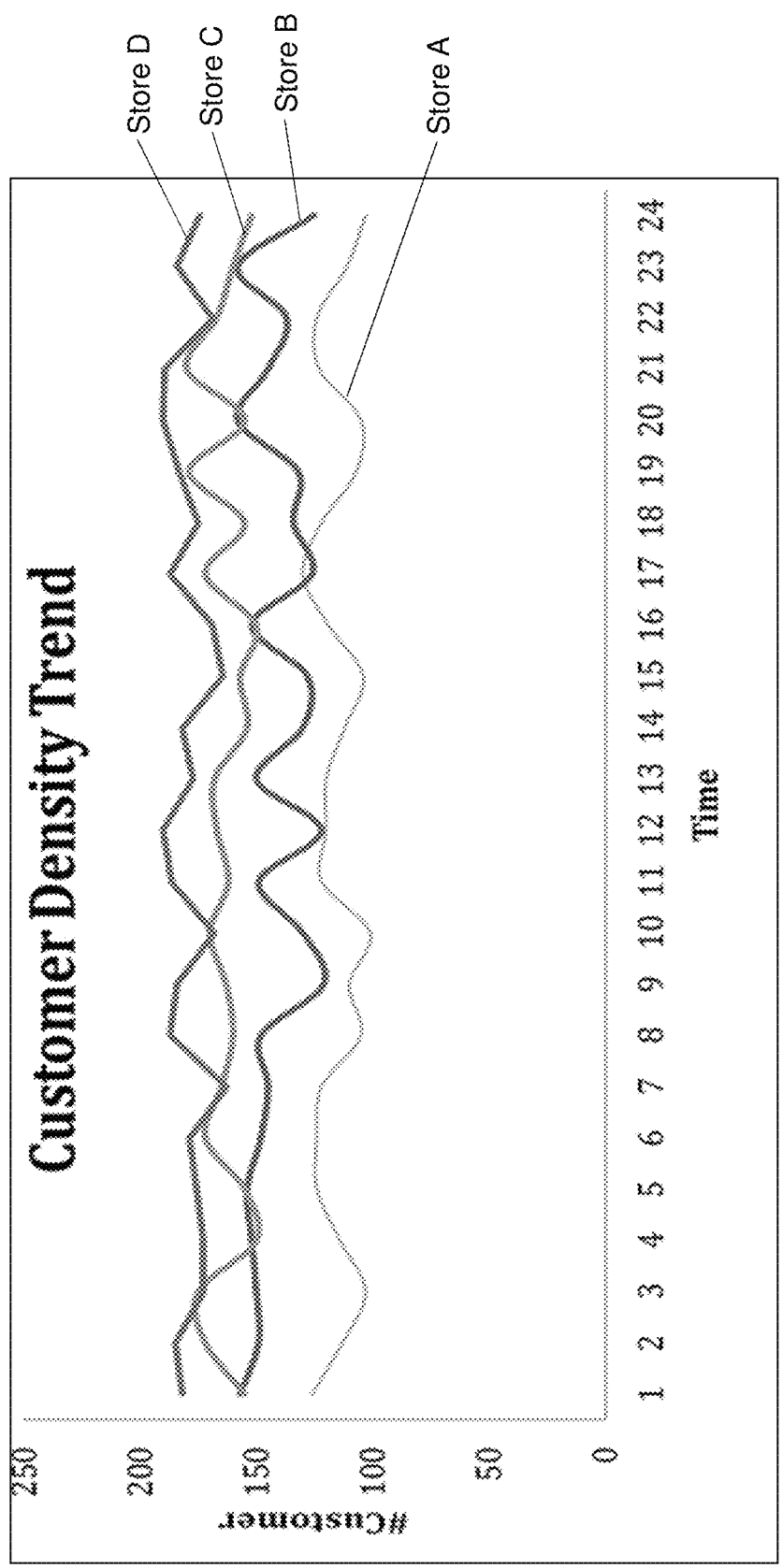
FIG. 5 is a graph of user density trends as generated by a distributed system for dynamic sensor-based trip estimation of the present disclosure.

In some embodiments, the data captured by the system 100 can be used by administrators of the facilities 102 to determine the number of users in the facilities 102 in real-time based on the density information 126. For example, FIG. 5 shows a graph of user density trends as generated by the system 100, and particularly shows the time and the number of users at the facility 102 at that time. Thus, Store A has a lower number of users throughout the day as compared to Store D. The output graph can be used by the administrators to ensure that sufficient staffing is provided during peak hours represented by the highest user densities.

Figure 6:
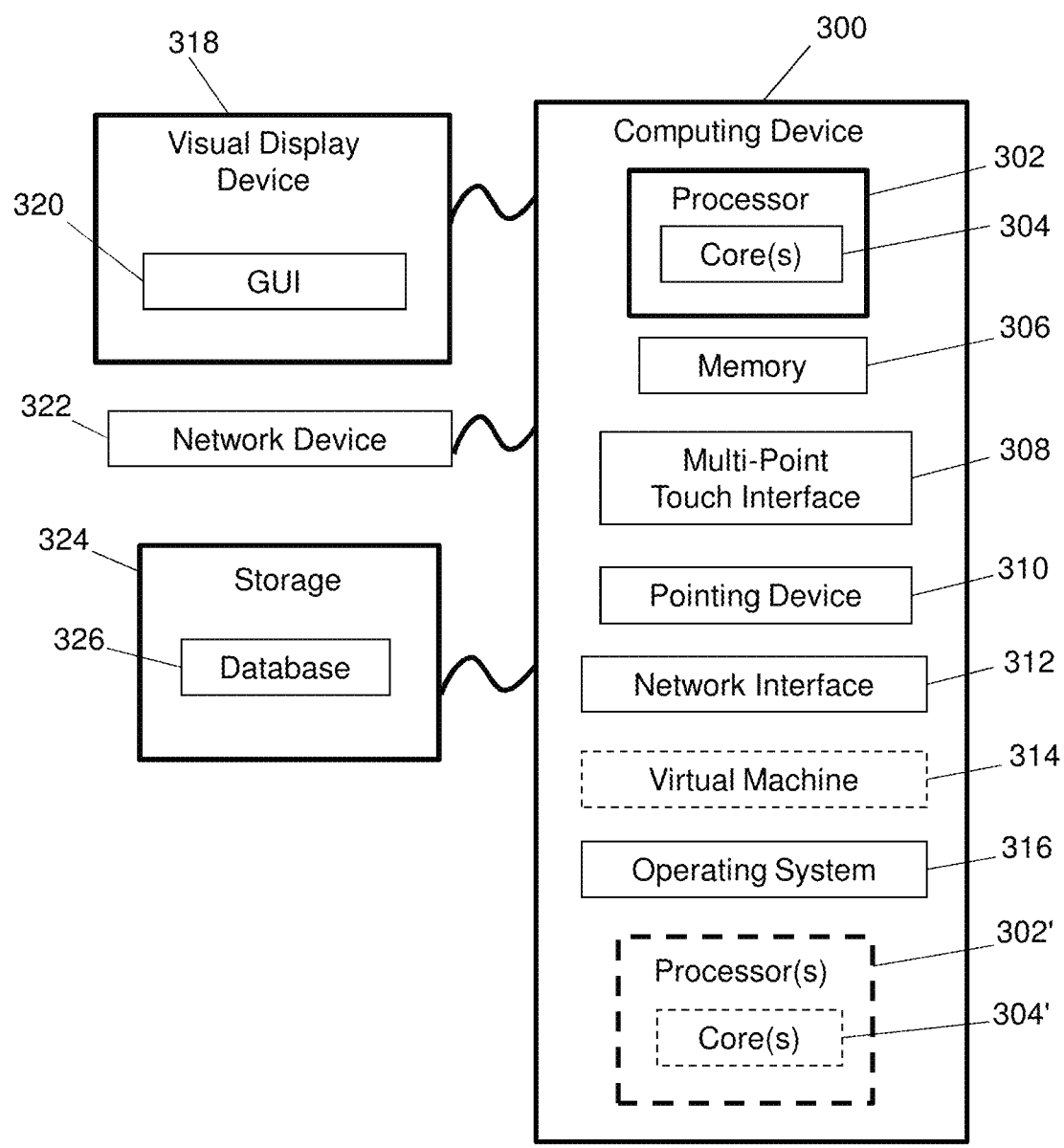
FIG. 6 is a block diagram of a computing device in accordance with exemplary embodiments of the present disclosure.

FIG. 6 is a block diagram of a computing device 300 in accordance with exemplary embodiments of the present disclosure. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the present disclosure (e.g., instructions for operating the sensors 110, 112, instructions for operating the computing system 128, instructions for operating the communication network 130, combinations thereof, or the like). The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device 300 may be shared dynamically. A virtual machine 314 may be provided to handle a process running on multiple processors so that the process appears to be using only one computing resource rather than multiple computing resources. Multiple virtual machines may also be used with one processor. Memory 306 may include a computer system memory or random access memory, such as DRAM, SRAM, EDO RAM, and the like. Memory 306 may include other types of memory as well, or combinations thereof.

A user may interact with the computing device 300 through a visual display device 318 (e.g., a personal computer, a mobile smart device, or the like), such as a computer monitor, which may display one or more user interfaces 320 (e.g., GUI 124) that may be provided in accordance with exemplary embodiments. The computing device 300 may include other I/O devices for receiving input from a user, for example, a keyboard or any suitable multi-point touch interface 308, a pointing device 310 (e.g., a mouse). The keyboard 308 and the pointing device 310 may be coupled to the visual display device 318. The computing device 300 may include other suitable conventional I/O peripherals.

The computing device 300 may also include one or more storage devices 324, such as a hard-drive, CD-ROM, or other computer readable media, for storing data and computer-readable instructions and/or software that implement exemplary embodiments of the system 100 described herein. Exemplary storage device 324 may also store one or more databases 326 for storing any suitable information required to implement exemplary embodiments. For example, exemplary storage device 324 can store one or more databases 326 for storing information, such as data relating to the item information 116, the sensor information 118, the geographic information 120, the density information 126, the first transit value 136, the second transit value 140, the third transit value 146, the total transit value 148, the time/time range 150, the traffic information 142, the historical information 138, combinations thereof, or the like, and computer-readable instructions and/or software that implement exemplary embodiments described herein. The databases 326 may be updated by manually or automatically at any suitable time to add, delete, and/or update one or more items in the databases.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. Moreover, the computing device 300 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 316 may be run in native mode or emulated mode. In an exemplary embodiment, the operating system 316 may be run on one or more cloud machine instances.

Figure 7:
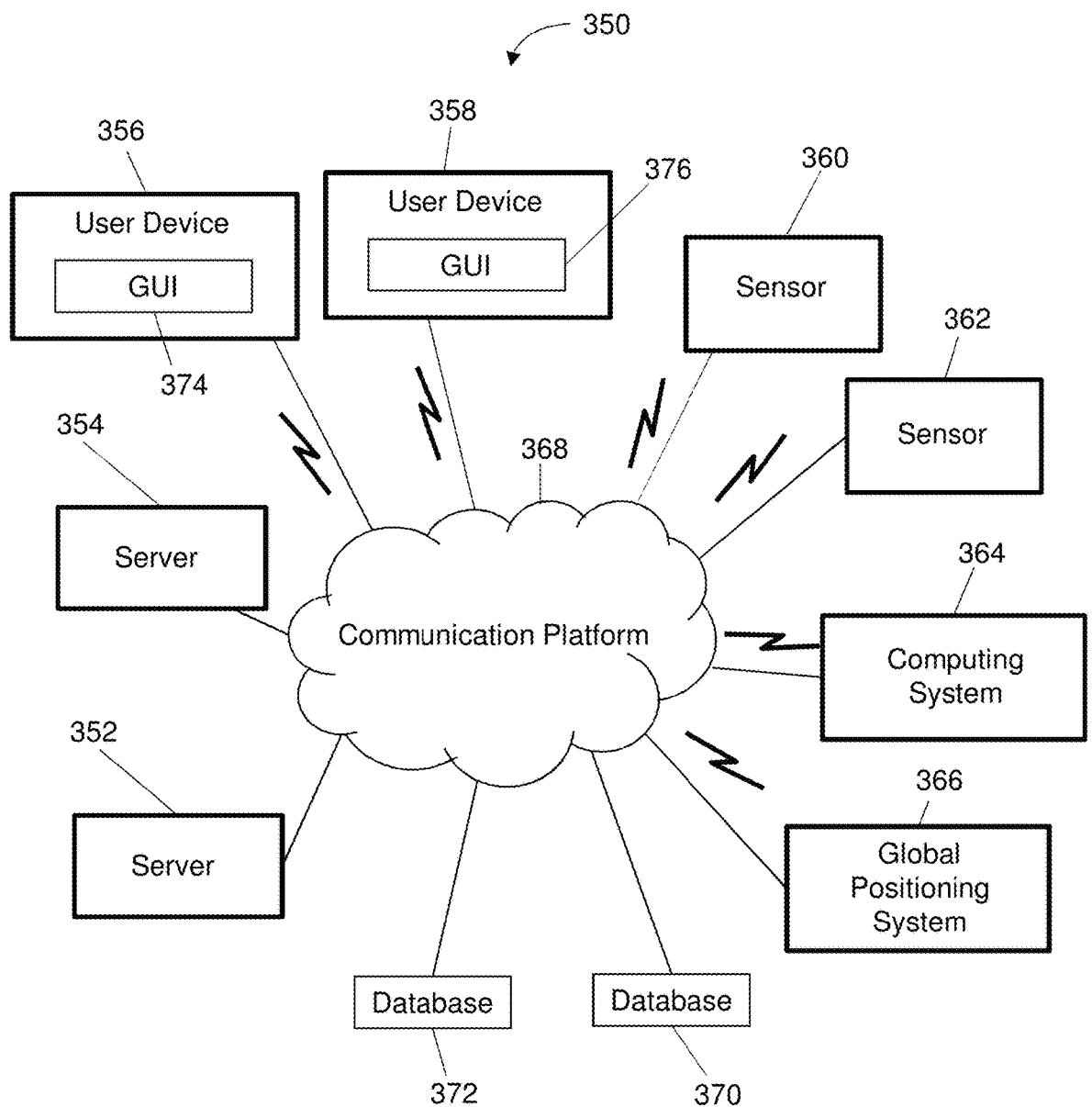
FIG. 7 is a block diagram of an exemplary distributed system environment in accordance with embodiments of the present disclosure.

FIG. 7 is a block diagram of an exemplary distributed system environment 350 for trip estimation in accordance with exemplary embodiments of the present disclosure. The environment 350 can include servers 352, 354 configured to be in communication with user devices 356, 358 (with GUIs 374, 376), and sensors 360, 362, via a communication platform 368, which can be any network over which information can be transmitted between devices communicatively coupled to the network. For example, the communication platform 368 can be the Internet, Intranet, virtual private network (VPN), wide area network (WAN), local area network (LAN), and the like. In some embodiments, the communication platform 368 can be part of a cloud environment. The environment 350 can include computing systems 364 and global positioning systems 366, which can be in communication with the servers 352, 354, as well as the user devices 356, 358 and sensors 360, 362, via the communication platform 368. The environment 350 can include repositories or databases 370, 372, which can be in communication with the servers 352, 354, as well as the user devices 356, 358, sensors 360, 362, computing systems 364, and global positioning systems 366, via the communications platform 368.

In exemplary embodiments, the servers 352, 354, user devices 356, 358, sensors 360, 363, computing systems 364, global positioning systems 366, and databases 370, 372 can be implemented as computing devices (e.g., computing device 300). Those skilled in the art will recognize that the databases 370, 372 can be incorporated into one or more of the servers 352, 354 such that one or more of the servers 352, 354 can include databases 370, 372. In some embodiments, the database 370 can store the item information 116, the sensor information 118, the geographic information 120, the density information 126, the first transit value 136, the second transit value 140, the third transit value 146, the total transit value 148, the time/time range 150, the traffic information 142, the historical information 138, combinations thereof, or the like.

Figure 8:
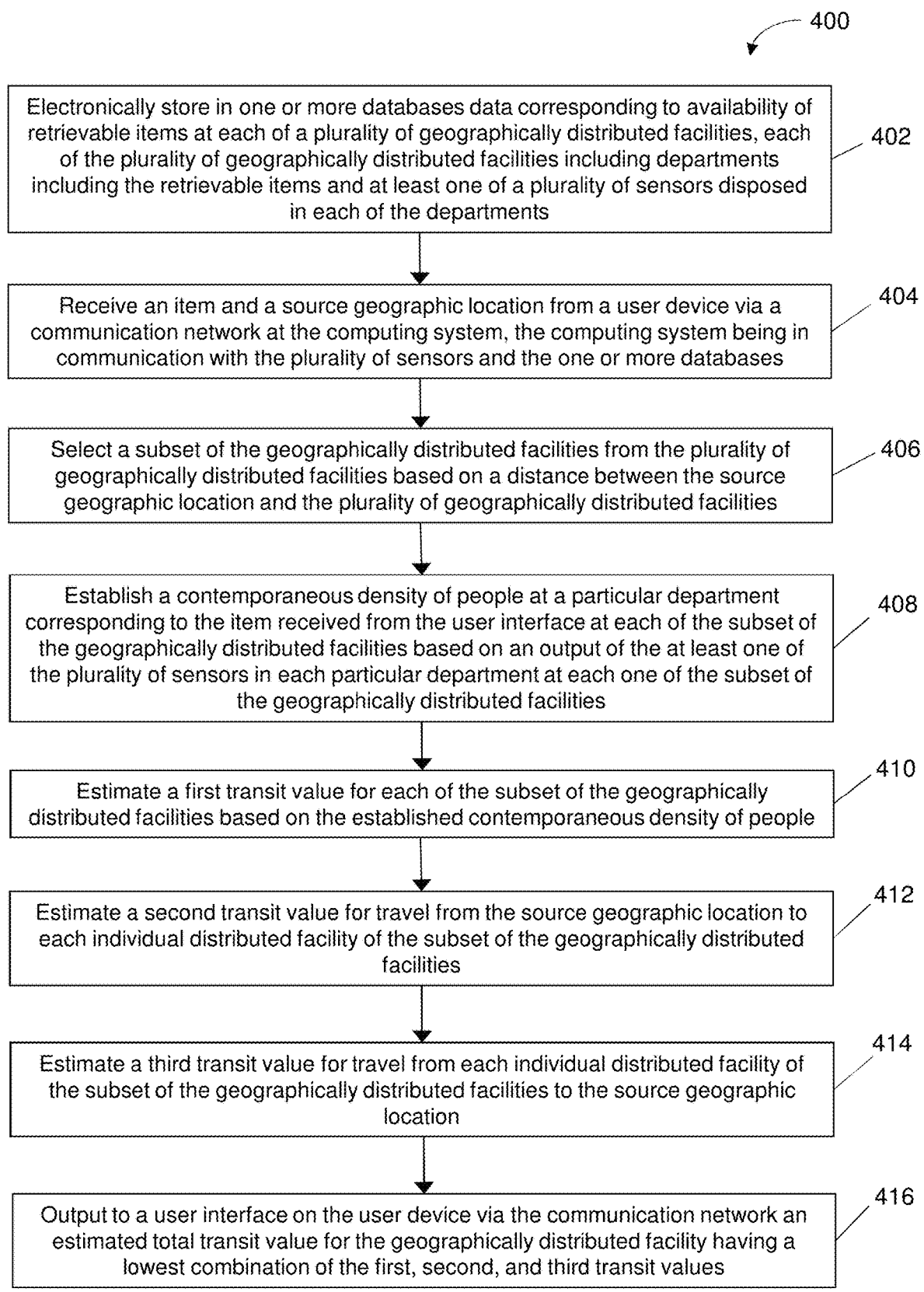
FIG. 8 is a flowchart illustrating a process implemented by an exemplary distributed system for dynamic sensor-based trip estimation in accordance with embodiments of the present disclosure.

FIG. 8 is a flowchart illustrating an exemplary process 400 as implemented by embodiments of the system 100. To begin, at step 402, data corresponding to availability of retrievable items at each of a plurality of geographically distributed facilities can be electronically stored in one or more databases. Each facility includes departments with retrievable items and a plurality of sensors. At step 404, an item and a source geographic location can be received from a user device via a communication network. At step 406, a subset of the facilities can be selected from the plurality of facilities based on a distance between the source geographic location and the facilities.

At step 408, a contemporaneous sensed density of people at particular departments corresponding to items received from the user interface can be established for each facility in the subset of facilities based on an output from the sensors at each department of the facilities. At step 410, a first transit value can be estimated for each facility in the subset of facilities based on the established contemporaneous density of people. At step 412, a second transit value can be estimated for the travel from the source geographic location to each of the facilities of the subset of facilities. At step 414, a third transit value can be estimated for travel from the facilities to the source geographic location. At step 416, an estimated total transit value can be output to the user interface on the user device for the facility having the lowest combination of the first, second and third transit values.

Thus, the exemplary distributed system for trip estimation provides information to the user regarding the total estimated time for visiting a facility for procuring one or more items. In particular, the system estimates the total procurement time within the facility based on the detected density of people in each department for the items desired by the user. The user can thereby determine the optimal time for visiting the facility for procuring the items.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A distributed system for trip estimation, comprising:
a plurality of sensors disposed in a plurality of geographically distributed facilities, each of the plurality of geographically distributed facilities including departments including retrievable items, and each one of the plurality of geographically distributed facilities including at least one of the plurality of sensors in each of the departments;
one or more databases electronically storing data corresponding to availability of the retrievable items at each of the plurality of geographically distributed facilities;
a computing system in communication with the plurality of sensors and the one or more databases, the computing system being configured to:
receive an item and a source geographic location from a user device via a communication network;
select a subset of the geographically distributed facilities from the plurality of geographically distributed facilities based on a distance between the source geographic location and the plurality of geographically distributed facilities;
establish a contemporaneous density of people at a particular department corresponding to the item received from the user device at each of the subset of the geographically distributed facilities based on an output of the at least one of the plurality of sensors in each particular department at each one of the subset of the geographically distributed facilities;
estimate a first transit value for each of the subset of the geographically distributed facilities based on the established contemporaneous density of people;
estimate a second transit value for travel from the source geographic location to each individual distributed facility of the subset of the geographically distributed facilities;
estimate a third transit value for travel from each individual distributed facility of the subset of the geographically distributed facilities to the source geographic location; and
output to a user interface on the user device via the communication network an estimated total transit value for the geographically distributed facility having a lowest combination of the first, second, and third transit values,
wherein the estimated first transit value is a time period for locating the item and procuring the item at each of the subset of the geographically distributed facilities based on the established contemporaneous density of people.

2. The distributed system of claim 1, wherein the contemporaneous density of people is established in real-time.

3. The distributed system of claim 1, wherein the computing system is configured to electronically transmit data corresponding to the established contemporaneous density of people to the one or more databases.

4. The distributed system of claim 1, wherein the computing system is configured to output to the user interface on the user device via the communication network a ranked list of the subset of the geographically distributed facilities based on the estimated total transit values for each of the geographically distributed facilities of the subset of the geographically distributed facilities.

5. The distributed system of claim 1, wherein the computing system is configured to receive a time or time range for traveling to one of the plurality of geographically distributed facilities from the user interface of the user device via the communication network.

6. The distributed system of claim 5, wherein the computing system is configured to estimate an optimal estimated total transit value within the time range.

7. The distributed system of claim 1, wherein the estimated second transit value and the estimated third transit values are determined based on a global positioning system in communication with the computing system via the communication network.

8. The distributed system of claim 1, wherein the one or more database electronically store data corresponding to historical first transit values associated with the retrievable items at each of the plurality of geographically distributed facilities.

9. The distributed system of claim 8, wherein the computing system is configured to estimate the first transit value for each of the subset of the geographically distributed facilities based on the established contemporaneous density of people and the historical first transit values.

10. The distributed system of claim 1, wherein each of the plurality of geographically distributed facilities includes at least one of the plurality of sensors in a procurement area.

11. The distributed system of claim 10, wherein the computing system is configured to establish a contemporaneous density of people at the procurement area at each of the subset of the geographically distributed facilities based on an output of the at least one of the plurality of sensors at each one of the plurality of geographically distributed facilities.

12. The distributed system of claim 11, wherein the computing system is configured to estimate the first transit value for each of the subset of the geographically distributed facilities based on the established contemporaneous density of people at the department corresponding to the item received from the user interface and the established contemporaneous density of people at the procurement area.

13. The distributed system of claim 1, wherein the computing system is configured to output to the user interface on the user device via the communication network an unavailability of the item at the subset of the geographically distributed facilities.

14. A non-transitory computer-readable medium storing instructions for estimating a total transit value that are executable by a processing device of a computing system, wherein execution of the instructions by the processing device causes the processing device to:
  electronically store in one or more databases data corresponding to availability of retrievable items at each of a plurality of geographically distributed facilities, each of the plurality of geographically distributed facilities including departments including the retrievable items and at least one of a plurality of sensors disposed in each of the departments;
  receive an item and a source geographic location from a user device via a communication network at the computing system, the computing system being in communication with the plurality of sensors and the one or more databases;
  select a subset of the geographically distributed facilities from the plurality of geographically distributed facilities based on a distance between the source geographic location and the plurality of geographically distributed facilities;
  establish a contemporaneous density of people at a particular department corresponding to the item received from the user device at each of the subset of the geographically distributed facilities based on an output of the at least one of the plurality of sensors in each particular department of each one of the subset of the geographically distributed facilities;
  estimate a first transit value for each of the subset of the geographically distributed facilities based on the established contemporaneous density of people;
  estimate a second transit value for travel from the source geographic location to each individual distributed facility of the subset of the geographically distributed facilities;
  estimate a third transit value for travel from each individual distributed facility of the subset of the geographically distributed facilities to the source geographic location; and
  output to a user interface on the user device via the communication network an estimated total transit value for the geographically distributed facility having a lowest combination of the first, second, and third transit values,
  wherein the estimated first transit value is a time period for locating the item and procuring the item at each of the subset of the geographically distributed facilities based on the established contemporaneous density of people.

15. The medium of claim 14, wherein execution of the instructions by the processing device causes the processing device to output to the user interface on the user device via the communication network a ranked list of the subset of the geographically distributed facilities based on the estimated total transit values for each of the geographically distributed facilities of the subset of the geographically distributed facilities.

16. The medium of claim 14, wherein execution of the instructions by the processing device causes the processing device to receive a time or time range for traveling to one of the plurality of geographically distributed facilities from the user interface of the user device via the communication network.

17. The medium of claim 16, wherein execution of the instructions by the processing device causes the processing device to estimate an optimal estimated total transit value within the time range.

18. The medium of claim 14, wherein each of the plurality of geographically distributed facilities includes at least one of the plurality of sensors in a procurement area, and wherein execution of the instructions by the processing device causes the processing device to establish a contemporaneous density of people at the procurement area at each of the subset of the geographically distributed facilities based on an output of the at least one of the plurality of sensors at each one of the plurality of geographically distributed facilities.

19. A method of estimating a total transit value, comprising:
  electronically storing in one or more databases data corresponding to availability of retrievable items at each of a plurality of geographically distributed facilities, each of the plurality of geographically distributed facilities including departments including the retrievable items and at least one of a plurality of sensors disposed in each of the departments;
  receiving an item and a source geographic location from a user device via a communication network at the computing system, the computing system being in communication with the plurality of sensors and the one or more databases;
  selecting a subset of the geographically distributed facilities from the plurality of geographically distributed facilities based on a distance between the source geographic location and the plurality of geographically distributed facilities;
  establishing a contemporaneous density of people at a particular department corresponding to the item received from the user device at each of the subset of the geographically distributed facilities based on an output of the at least one of the plurality of sensors in each particular department at each one of the subset of the geographically distributed facilities;

estimating a first transit value for each of the subset of the geographically distributed facilities based on the established contemporaneous density of people;

estimating a second transit value for travel from the source geographic location to each individual distributed facility of the subset of the geographically distributed facilities;

estimating a third transit value for travel from each individual distributed facility of the subset of the geographically distributed facilities to the source geographic location; and outputting to a user interface on the user device via the communication network an estimated total transit value for the geographically distributed facility having a lowest combination of the first, second, and third transit values, wherein the estimated first transit value is a time period for locating the item and procuring the item at each of the subset of the geographically distributed facilities based on the established contemporaneous density of people.

* * * * *